Figure 1:
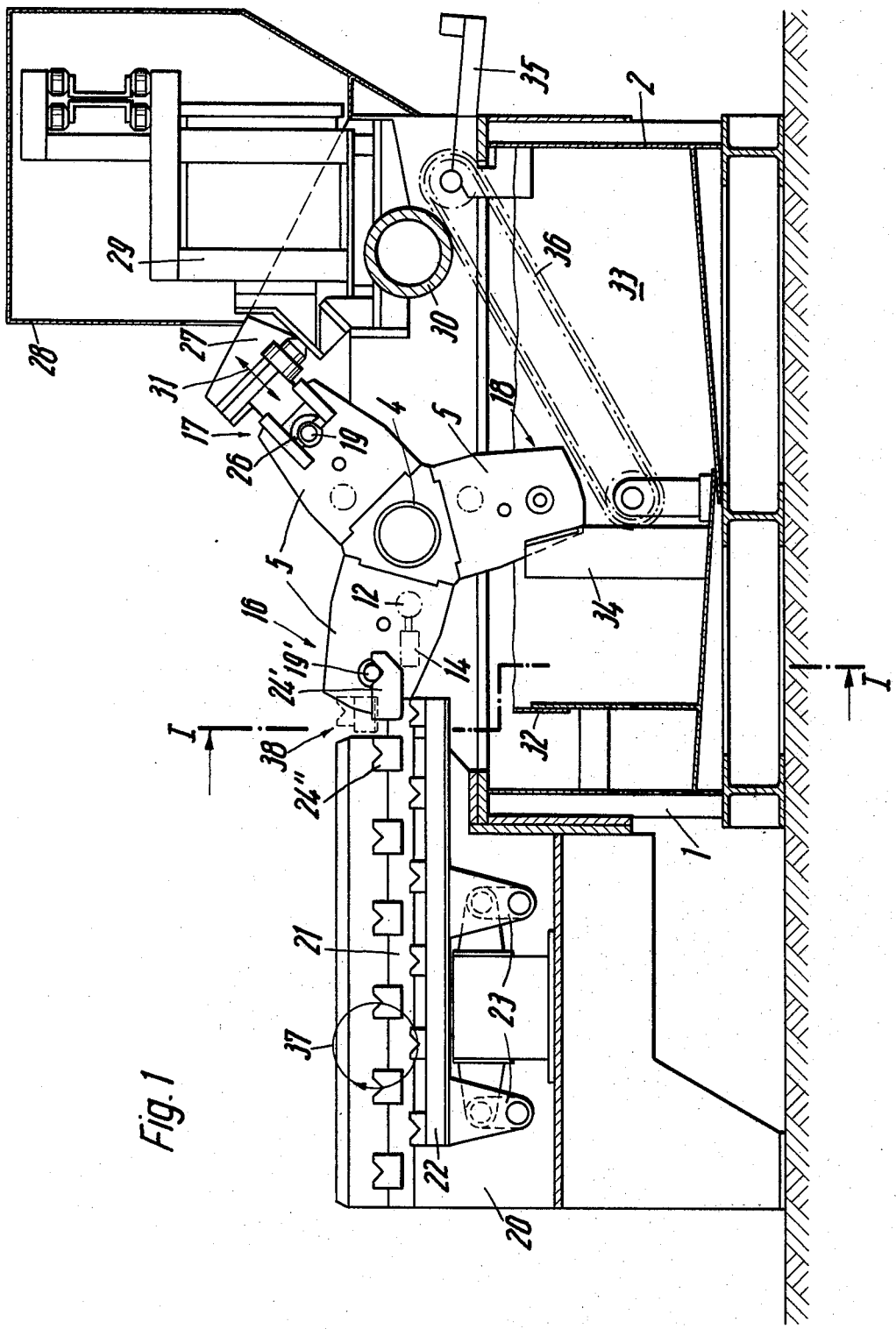

United States Patent
Emde et al.

[11] 3,883,006
[45] May 13, 1975

[54] MACHINE FOR TREATING, PARTICULARLY FOR INDUCTIVELY HARDENING WORKPIECES

[75] Inventors: Friedhelm Emde, Huckeswagen; Edgar Stengel, Wuppertal-Hahnerberg, both of Germany

[73] Assignee: AEG-Elotherm GmbH, Remscheid, Germany

[22] Filed: Sept. 26, 1973

[21] Appl. No.: 400,835

[30] Foreign Application Priority Data
Sept. 30, 1972 Germany.............................. 2248053

[52] U.S. Cl.............................................. 214/1 BD
[51] Int. Cl............................................. B65g 25/04
[58] Field of Search............ 214/1 BD; 198/25, 219, 198/210

[56] References Cited
UNITED STATES PATENTS
3,687,275   8/1972   Broser................................ 198/219
3,717,940   2/1973   Wylie............................. 198/210 X FOREIGN PATENTS OR APPLICATIONS
1,168,424  10/1969   United Kingdom................... 198/25

Primary Examiner—Albert J. Makay
Assistant Examiner—George F. Abraham
Attorney, Agent, or Firm—Cushman, Darby & Cushman

[57] ABSTRACT

A machine and method for treating workpieces, such as axles, shafts and the like, are supplied by a conveyor and mounted between carriers of an indexable spider which indexes the workpieces through loading, inductive hardening, quenching and unloading positions. The withdrawal of the carriers for gripping a workpiece and the presence of a loaded workpiece are sensed to indicate whether a workpiece has been correctly loaded. Multiple attempts to load the workpiece can be made if desired.

1 Claim, 2 Drawing Figures

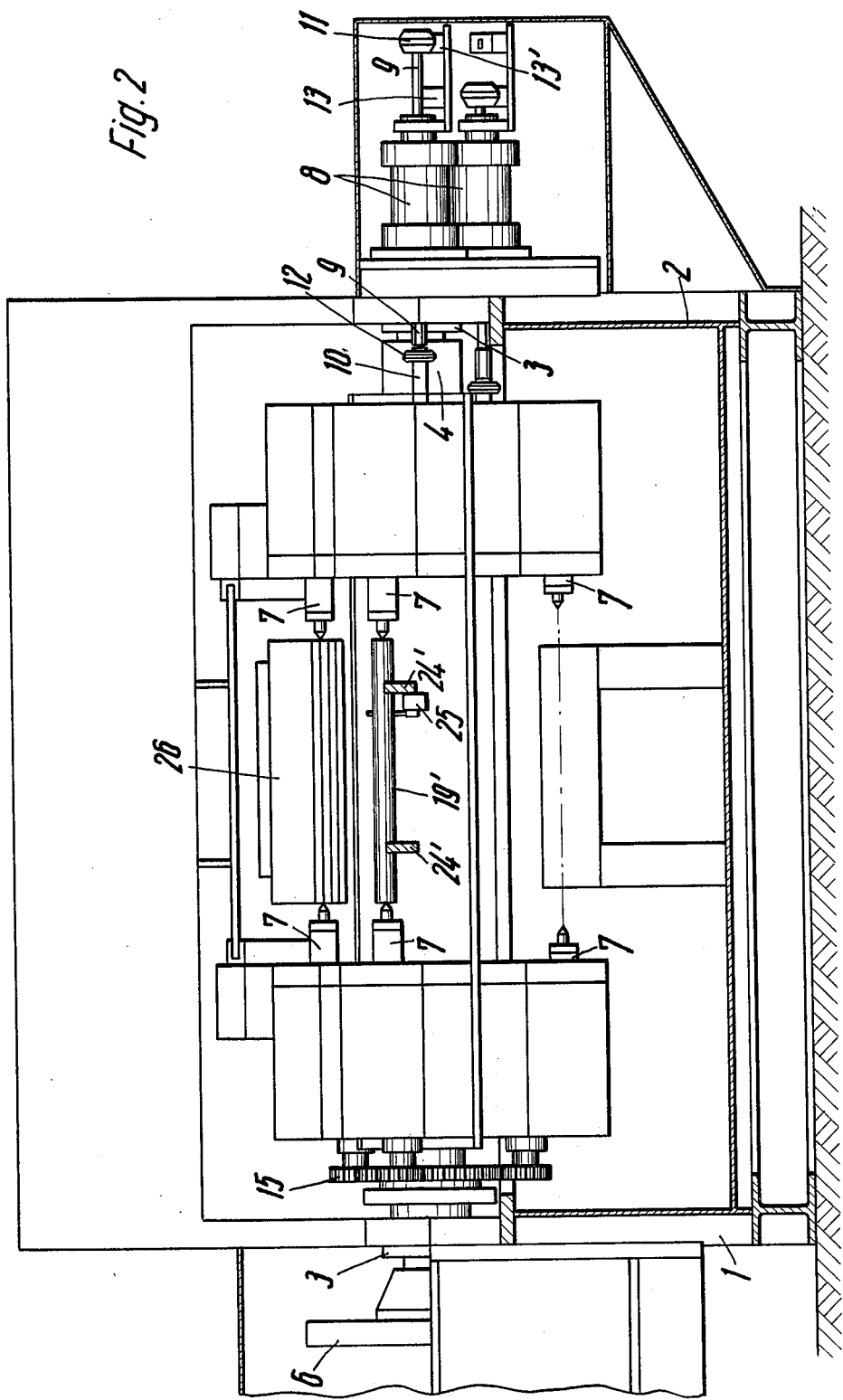

MACHINE FOR TREATING, PARTICULARLY FOR INDUCTIVELY HARDENING WORKPIECES

The invention relates to the treatment, particularly to the inductive hardening of workpieces having an axis of rotation, such as axles, shafts and the like, mounted between a pair of carrier arms of an indexable spider, the arms being fitted with spindle centers which can be moved in opposite directions to grip the workpieces between them and intermittently to convey the workpieces from a loading station, to one or more treating stations and then to an unloading station.

A machine of the specified kind for inductively hardening workpieces has been described for instance in the specification of U.S. Pat. No. 3,446,375. In such a machine, as further described for instance in U.S. Pat. No. 3,504,151, compression springs acting as energy storage means may be provided in the carrier arms of the spider for urging the spindle centers towards each other to close upon a workpiece. Since the retraction of the centers into their work-releasing positions, i.e. their movement away from each other against the resistance of the compression springs, is needed only when the pair of spider arms is stationary, actuators for thus operating the centers need be provided only at the loading and unloading stations where they can be attached in a fixed position to the framework of the machine.

In such an arrangement a workpiece is mounted at the end of an indexing turn of the spider by retracting the centers at the loading station into their work-releasing positions, feeding a workpiece to the loading station, for instance on a chain conveyor, and then allowing the centers to reclose on the workpiece into work-gripping position in which the workpiece is securely mounted.

If for any reason whatsoever a workpiece fails to be properly gripped, then the further treatment of preceding workpieces which are already in the machine must be interrupted until the workpiece that has failed to be gripped between the centers has been removed, for instance manually by the machine operator. This means that a preceding workpiece which has undergone its inductive heating treatment while the unsuccessful attempt was being made to mount the following workpiece cannot be quenched at the proper time and that it therefore becomes useless. This might be avoided if the process of inductive heating were delayed until the operation of mounting another workpiece at the loading station has been successfully accomplished. However, such a method would lead to a substantial reduction in the number of workpieces that could be hardened in the machine within a given period of time.

It is therefore an object of the present invention to provide a machine for treating, and particularly for inductively hardening workpieces having an axis of rotation, as well as a method of operating the machine, wherein an unsuccessful attempt at mounting a workpiece is stopped and the workpiece retained without interfering with or delaying the normal treating cycle of workpiece which at this time are already in the machine, and wherein the attempt at getting the difficult workpiece taken up by the centers can be repeated, perhaps several times, before such a workpiece is finally withdrawn.

The machine, according to the invention, achieves this object by comprising energy storage devices associated in conventional manner with the centers for urging the same into work gripping position, actuators at the loading and unloading stations for transferring the centers into their work releasing position, monitoring means for checking whether a workpiece has been correctly received, a lifting beam conveyor for feeding the workpieces to the loading station, the last workpiece resting on the stationary beam system of the lifting beam conveyor aligning with the centers which have arrived at the loading station, drive means for generating the lifting beam motion in both conveying directions and control means for stopping the lifting beam system in a first rest position which below the stationary beam system serves as a starting and end position for a conveying step and in a second rest position above the stationary beam system, and for reversing the direction of motion of the drive means at either of the two rest positions of the lifting beam system.

For automatically operating the proposed machine, the method according to the invention consists in retracting the centers at the loading station into their work-releasing positions, performing a conveying step of the lifting beam conveyor to convey a workpiece from the penultimate to the last workpiece rest on the stationary beam system, advancing the centers into their work-gripping position, retransferring the centers into their work-releasing position if the work is ascertained either not to have been gripped or to have been gripped incorrectly, then transferring the lifting beam system from its first into its second rest position by movement of the lifting beam system contrary to conveying direction, and removing the workpiece that had been incorrectly gripped from the lifting beam system in its second rest position.

A preferred mode of performing the proposed method comprises, after transferring the lifting beam system carrying a workpiece which had failed to be correctly gripped into its second rest position the lifting beam system is moved in conveying direction from its second into its first position of rest to carry out a second attempt to transfer the workpiece correctly to the centers and, in the event of this second attempt likewise being a failure, again returned into its second rest position. Preferably a predetermined number of attempts correctly to mount the same workpiece may be carried out before the workpiece is removed by the lifting beam system as being incapable of being correctly mounted.

The invention will now be more particularly described with reference to the drawings which illustrate a machine according to the invention for inductively hardening the surface of workpieces such as shafts, axles and so forth.

In FIG. 1, the machine is shown in a schematic longitudinal section, whereas

FIG. 2 is a cross section taken on the line I—I in FIG. 1.

The machine comprises a frame 1 containing a tank 2 for the reception of a liquid quench. Rotatably mounted in the frame 1 in bearings 3 (FIG. 2) above, the tank 1 is a shaft 4 which carries a pair of spiders each comprising three arms 5 radiating at angles of 120° from the shaft 4 which is associated with conventional intermittent drive means 6 (FIG. 2) for indexing the spider through an angle of 120° at a time. Each cooperating pair of spider arms 5 is fitted with spindle centers 7 and, as described in greater detail in German Pat. Specification No. 1,533,953, these are loaded by compression springs (not shown) which serve as energy storage means urging the centers 7 towards each other to grip a workpiece between them. The centers can be forced apart against the thrust of their respective springs to release the work by actuators 8 comprising an actuating rod 9 which aligns with an actuating pin 10 associated with each pair of spider arms 5. The actuating rods 9 and the actuating pins 10 carry cam means 11 and 12 respectively, which cooperate with limit switches 13 and 13' (FIG. 2) and 14 (FIG. 1). For imparting rotation to one center 7 of each cooperating pairs of centers (in FIG. 2, that on the left) a conventional epicyclic transmission 15 is provided.

Each of the three pairs of spider arms 5 can be indexed from a loading station 16 to a heating station 17 and then to a quenching and unloading station 18 by appropriate rotation of shaft 4 (FIG. 1).

For feeding the workpieces 19 to the loading station 16 a lifting beam conveyor 20 is provided. Besides a system of fixed beams 21, this contains a system 22 of lifting beams which are attached to a parallel crank motion 23 for imparting a circular translatory movement to the lifting beams. The system of fixed beams 21 contains a number of workpiece rests 24, the final workpiece rest 24' of the fixed beam system aligning with the pair of centers which has just been indexed into the loading station 16. In order to detect the presence of a workpiece in the final workpiece rest 24', a limit switch 25 (FIG. 2) fitted with a feeler lever is provided at the loading station.

At the heating station 17, an inductor 20 is provided for inductively heating the workpieces. Mounted on a lever arm this inductor in conventional manner forms a rigid unit with a transformer 29 which feeds it and which is contained in a housing 28. This unit is mounted in frame 1 to tilt about a shaft 30. Tiltable deflection of the unit in the directions indicated by arrows 31 permits the inductor 26 to be transferred from its working position in FIG. 1 embracing the workpiece 20 into a position of rest or back again from the position of rest into working position.

The tank 2 which is filled to the level of an overflow 32 with a liquid quench 33 contains a sprayer 34 adapted to quench a workpiece that has been indexed into the quenching and unloading station 18. For unloading the workpiece from the tank 2 in this station and for depositing the same on a delivery table 35 above the tank 2, a chain conveyor 36 is provided.

The above-described machine functions as follows:

During operation of the machine, the centers 7 which are rotated by the epicyclic transmission 16 together with the workpiece 19 gripped by the centers 7, rotate continuously, irrespectively as to whether the pair of spiders is stationary or in course of being indexed. When a workpiece 19 has been inductively heated at the heating station 17, the inductor 26 is first tiltably raised from working position into its position of rest. The pair of spiders is then indexed through an angle of 120°, as a result of which the workpiece that has just been heated is carried to the quenching and unloading station 18, whereas a fresh workpiece 19 which has been mounted at the loading station 16 is transferred to the heating station 17. At the same time as the inductor 26 is tilted back into its working position and the inductive heating of the workpiece begins, the pneumatic actuator 8 at the loading station 16 operates its actuating rod 9 which displaces the actuating pin 10 on the pair of spider arms 5 at the loading station 16 (in FIG. 2 to the left). This results in the center 7 being retracted into work-releasing positions prior to gripping the ends of a fresh workpiece. The effective withdrawal of the centers is detected by a limit switch 13 which is operated by a cam 11 on the actuating rod 9. The signal thus generated causes the lifting beam conveyor 20 to perform one step in which the system of lifting beams 22 is moved by the parallel crank drive 23 in translatory motion from a first position of rest shown in FIG. 1 through a full circle 37 back again into its original position of rest. During this conveying step of the lifting beam conveyor 20, the lifting beam system 22 transfers a workpiece 19' from the penultimate workpiece rest 24'' on the stationary beam system 21 in the direction towards the loading station into the last workpiece rest 24', where its ends register with the centers 7 of the pair of spider arms 5 which has stopped at the loading station 16. Triggered by the termination of this conveying step, while a signal reports the presence of a workpiece 19' in the final workpiece rest 24' by the limit switch 25, the actuating rod 9 of the actuator 8 associated with the loading station 16 is returned into its former position (i.e. on the right in FIG. 2) and this is again reported by a signal generated by the limit switch 13'. The shift of the actuating rod 9 releases the actuating pin 10 on the pair of spider arms 5 and this allows the centers 7 to be forced by their loading springs back into work-gripping position in which under normal conditions the centers 7 will engage the ends of the workpiece 19'. When the centers 7 have moved into positions in which the distance between them signifies that a workpiece has been correctly mounted, the cam 12 on the actuating pin 10 operates a limit switch 14 (which is shown only in FIG. 1 for the sake of greater clarity) and this generates a signal indicating that a workpiece 19' has been correctly gripped. This signal in conjunction with an existing signal indicating that the actuating rod 9 has reached its end position, triggers a further indexing step of shaft 4 carrying the spiders, provided the completion of inductive heating of the workpiece 19' at the heating station is also reported.

If a signal reporting the return of the actuating rod 9 into its former position is generated in the absence of a signal reporting the correct mounting of a workpiece although the limit switch 25 has signalled the presence of a workpiece in the final workpiece rest 24', then the actuating rod 9 will again be displaced against the actuating pin 10 to reopen the centers 7. When this is the case, a signal reporting the fact causes the direction of motion of the double crank motion 23 and the movement of the lifting beam system 22 to be reversed and its lifting beam to be transferred from a first position of rest underneath the fixed beam system 21 into a second position of rest indicated by 38 in FIG. 1, thereby picking up the workpiece 19' which has failed to be gripped by the centers and lifting it out of the workpiece rest 24' of the fixed beam system 21 and conveying it out of range of the centers 7. The stopping of the lifting beam system 20 in its second position of rest is reported by a suitable limit switch (not shown in the drawings) which generates a signal. This signal, which causes the direction of motion of the double crank drive 23 to be reversed, again re-initiates the transfer of the actuating rod 9 into its starting position and by virtue of the consequent operation of limit switch 13' by the cam 11, and in the presence of a signal indicating that the lifting beam system 22 is in the second position of rest, a further indexing step of the shaft 4 and spider arms takes place, whereas any further movement of the lifting beam system 22 is temporarily blocked and an acoustic or optical signal generated. The workpiece 19', which has not been taken up, can then be removed from the lifting beam system 22 which is in its second position of rest without any interference with the hardening step to which the previous workpiece 19 has been subjected at the heating station 17. A subsequent release of the lock by the operator pressing a switch permits the lifting beam system 22 to start a fresh conveying step which now begins from the second, instead of, as normally from the first, position of rest of the lifting beam system 22.

If now after the completion of a conveying step by the lifting beam conveyor 20, the limit switch 25 fails to report the presence of a workpiece 19' in the last workpiece rest 24', i.e. if no workpiece has been transferred from the penultimate (24'') to the final workpiece rest 24', then the transfer of the centers 7 into gripping position is followed either by the immediate initiation of another indexing step of shaft 4 and the spiders or, if the period for treating the workpieces in the cycle is sufficiently long, another conveying step of the lifting beam conveyor 20 may be initiated. As soon as the presence of a workpiece 19' in the final workpiece rest 24' has been reported, the further operation of the machine proceeds normally as before.

Since failure to pick up a workpiece between the centers is not always due to some peculiarity of the particular workpiece 19', but may also be caused by accidental imprecise placing of the workpiece in the workpiece rest 24', a modification of the proposed method provides for additional attempts being made to mount the workpiece, the lifting beam system 22 not being blocked and no acoustic or optical signal generated to indicate that a rejected workpiece requires removal until these reported attempts have first been made.

Each of these additional attempts is initiated without moving the centers 7 back into their gripping positions by transferring the lifting beam system 22 immediately after it has reached its second position of rest back into its first position of rest in conveying direction to retransfer the workpiece 19' into the final workpiece rest 24' and by then closing the centers 7 to grip the workpiece 19'. If this attempt at mounting the workpiece proves to be successful, the further course of events is exactly the same as if there had been no unsuccessful attempt. However, if the further attempt is abortive, then the lifting beam system 22 is returned into its second position of rest.

These additional attempts at getting the workpiece properly mounted are performed consecutively during a single step of the working cycle — provided the duration of the step is sufficient — or otherwise they are divided between several consecutive working steps before a signal is generated indicating that a workpiece 19' has not been accepted and should be removed. In the latter alternative it will be readily understood that the conveying step of the lifting beam conveyor 20 for an additional attempt at transferring the workpiece must begin from the second position of rest of the lifting beam system 22 rather than from the first.

Many changes and modifications in the above-described embodiments of the invention can, of course, be carried out without departing from the scope thereof. Accordingly, that scope is intended to be limited only by the scope of the appended claims.

What is claimed is:

1. In an apparatus for treating and particularly for inductively hardening workpieces having an axis of rotation mounted between a pair of carrier arms of an indexable spider, said arms being fitted with spindle centers which can be moved in opposite directions to grip the workpieces between them and intermittently to convey the workpieces from a loading station to one or more treating stations and then to an unloading station, the improvement comprising energy storage devices mounted with the centers for urging the same into work gripping position, actuators at the loading and unloading stations for transferring the centers into their work releasing position, monitoring means for checking whether a workpiece has been correctly received after loading, a lifting beam conveyor comprising a stationary beam and a lifting beam for feeding the workpieces in a foreward and rearward direction relative to the loading station, each beam comprising a plurality of workpiece rests, the last workpiece rest on the stationary beam of the lifting beam conveyor aligning with the centers which have arrived at the loading station, drive means for generating lifting beam motion in both directions and control means responsive to said monitoring means for stopping the lifting beam in a first rest position below the stationary beam, which serves as a starting and end position for a conveying step and in a second rest position above the stationary beam, and for reversing the direction of motion of the drive means at either of the two rest positions of the lifting beam.

* * * * *